(12) United States Patent
Hamm et al.

(10) Patent No.: US 6,863,908 B2
(45) Date of Patent: Mar. 8, 2005

(54) UNIVERSAL SAUCE BASE

(75) Inventors: Donald Joseph Hamm, New Providence, NJ (US); Silverio Luiz Tecedor, Bosques de Chapultepec (MX); Christopher B. Puno, Neshanic Station, NJ (US); Shirley A. Hawthorne, Fords, NJ (US); Catherine Titus Felix, Asbury, NJ (US)

(73) Assignee: Unilever Bestfoods, North America division of Conopco Inc., Englewood Cliffs, NJ (US)

( * ) Notice: Subject to any disclaimer, the term of this patent is extended or adjusted under 35 U.S.C. 154(b) by 287 days.

(21) Appl. No.: 10/132,030

(22) Filed: Apr. 25, 2002

(65) Prior Publication Data

US 2003/0203096 A1 Oct. 30, 2003

(51) Int. Cl.[7] .............................. A23L 1/24; A23L 1/39
(52) U.S. Cl. ..................... 426/47; 426/589; 426/578; 426/602; 426/605; 426/650; 426/654
(58) Field of Search .................... 426/47, 589, 578, 426/654, 650, 605, 602

(56) References Cited

U.S. PATENT DOCUMENTS

| | | | |
|---|---|---|---|
| 3,955,010 A | | 5/1976 | Chozianin et al. |
| 4,034,124 A | * | 7/1977 | van Dam ................. 426/602 |
| 4,119,564 A | * | 10/1978 | Van Dam ................. 516/56 |
| 4,145,451 A | | 3/1979 | Oles |
| 4,612,197 A | * | 9/1986 | Postner .................... 426/47 |
| 4,756,919 A | | 7/1988 | Cirigliano et al. |
| 4,861,613 A | | 8/1989 | White et al. |
| 4,927,657 A | * | 5/1990 | Antaki et al. ............ 426/589 |
| 5,028,447 A | * | 7/1991 | Schenk ................... 426/605 |
| 5,082,674 A | | 1/1992 | Carrell et al. |
| 5,169,670 A | | 12/1992 | Yang |
| 5,304,665 A | | 4/1994 | Cooper et al. |
| 5,738,891 A | * | 4/1998 | Andreae et al. .......... 426/113 |
| 5,945,149 A | * | 8/1999 | Andreae et al. .......... 426/602 |
| 6,660,312 B2 | * | 12/2003 | Tobita et al. ............. 426/47 |

FOREIGN PATENT DOCUMENTS

| | | |
|---|---|---|
| EP | 0 433 016 A | 6/1991 |
| EP | 0 571 219 A | 11/1993 |
| EP | 0 667 105 A | 6/1995 |
| WO | 03/029178 | 4/2003 |

* cited by examiner

Primary Examiner—N. Bhat

(57) ABSTRACT

A universal sauce base, i.e. an edible composition, having a low pH for use in hot or cold food applications that is microbiologically stable, heat stable and freeze-thaw tolerant. The universal sauce base has an oil-in-water emulsion and comprises water, vegetable oil, starch, phospholipase A2 modified egg yolk and inorganic acid acidulent including at least phosphoric acid and other ingredients. The universal sauce base has a bland and non-sour flavor, can be used in a wide variety of food applications and can be combined with a wide range of flavors and other ingredients.

20 Claims, No Drawings

UNIVERSAL SAUCE BASE

BACKGROUND OF THE INVENTION

1. Field of the Invention

The invention relates to a microbiologically stable, heat stable and freeze-thaw tolerant universal sauce base, i.e. an edible composition, having a low pH for use in hot or cold applications. The universal sauce base comprises an oil-in-water emulsion and egg yolk treated with phospholipase A2. The universal sauce base is bland in flavor and can be seasoned to taste. It has a wide variety of uses in the food service industry, as an ingredient in retail food products and in home use. The universal sauce base will not impart sourness to foods.

2. The Prior Art

Controlling food spoilage due to microbial activity in oil-in-water emulsion products such as mayonnaise and salad dressing has been achieved in the art by controlling pH and/or water activity. Examples include synergistic combinations of acetic acid and phosphoric acid in mayonnaise or dressing formulations (U.S. Pat. No. 4,145,451); food products comprising fumaric acid and, optionally, food grade acidulent (U.S. Pat. No. 4,756,919); edible acids and buffering salts (U.S. Pat. No. 4,927,657) and restricting the content of bacterial nutrients combined with acidic ingredients (U.S. Pat. No. 3,955,010). A consequence of using organic acids in food products is sour flavor notes that can be carried into foods prepared with oil-in-water emulsion products.

Microbiological stability is particularly pertinent in the food service industry where large amounts of sauces and other ingredients subject to microbial sporage are used. Sauces and ingredients that are protected from spoilage with minimal special handling requirements are desired. An ideal ingredient for the food service industry, as well as in food manufacturing and for domestic use, is a shelf-stable product that can be opened and used over long periods of time without spoilage. Such a product, particularly one which is bland in flavor and has no or minimal sour flavor attributes, should be desired by the food service industry and the domestic cook.

There are five basic sauces conventionally used in foods, particularly in the food service industry or in prepared foods. These sauces are Espangole (brown stock based), Velouté, (light stock based), Béchamel (basic white sauce), Hollandaise sauce and mayonnaise (both emulsified sauces). Many of these sauces are subject to spoilage, examples of which are Velouté sauces which are white sauces made with a chicken, veal stock or fish fumet that may sometimes be enriched with egg yolks or cream and can be a base for other sauces, "blond" roux and Béchamel sauce, which is a basic French white sauce made by stirring milk into a butter-flour roux. Béchamel sauce, which has a limited shelf life, generally requires 30 minutes after misé en place to prepare and must be held on a steam table during service at between about 165° F. and about 180° F. for microstability purposes.

Powdered sauce mixes that are reconstituted at the time of use have been developed; however, once the powdered mixes are reconstituted, the reconstituted sauce will be subject to spoilage. Also, these reconstituted sauces have ingredients different from that of freshly prepared sauces. For example Hollandaise Sauce Mix available from DELICO Corporation, Point Claire, Quebec, Canada contains the following ingredients: skim milk powder, wheat flour, modified corn starch, monosodium glutamate, egg yolk powder, dehydrated onions, hydrolyzed plant protein, salt, vegetable oil, citric acid, locust bean gum, guar gum, disodium inosinate, disodium guanylate and spices. Freshly prepared hollandaise sauces are generally prepared from egg yolks, butter, lemon juice and spices.

Powdered sauce mixes also do not save the preparation time needed for making fresh sauces. For example, reconstitution of the hollandaise sauce from DELICO Corporation requires melting salted margarine or butter, blending in powdered sauce mix, stirring well, adding cold water, bringing the contents to a boil and then simmering for 1 minute while stirring constantly with a whisk.

Heat stability is a desired aspect of oil-in-water emulsions, as well as other types of emulsions. In addition to heat stability, emulsion texture is an important aspect of an emulsion-type food. Emulsifiers play an important role maintaining heat stability and texture for emulsions and emulsion-based food products.

U.S. Pat. No. 4,119,564 discusses the use of phospholipoprotein modified by phospholipase A in oil-in-water emulsions to provide a viscosity increasing effect. U.S. Pat. No. 5,028,447 discusses the use of phospholipoprotein material modified by phospholipase A in an emulsion containing at least one native starch-thickening agent. U.S. Pat. No. 5,082,674 describes dried food products comprising dried lyso-phospholipoprotein, made by use of phospholipase A, or compositions containing the dried lyso-phospholipoprotein.

The modified phospholipoprotein is obtained by using a phospholipase enzyme to cleave the bond binding the fatty acid radical to the glycerol part of the phospholipid. There are generally two types of phospholipid A for this purpose, phospholipase A1 which cleaves the bond in the 1-position of the phospholipoprotein molecule and phospholipase A2 which cleaves the bond in the 2-position of the phospholipoprotein molecule. U.S. Pat. No. 4,612,197 describes sauce enhancers having a pH from 5.6 to 5.8 comprising cream, egg yolk modified by phospholipase A2 and a liquid butter fat fraction.

It was an object of the invention to develop a universal sauce base having an oil-in-water emulsion that is bland in flavor and generally not sour tasting, and will not effect the natural flavor of the ingredients of the dish that it is added to or can be combined with flavorings or other savory items as a sauce for foods, such as those discussed above, and carry the flavorings and savory taste without any effect from the universal sauce base itself.

It was also an object of the invention to develop a sauce that is microbiologically stable yet bland in flavor and generally not sour tasting having long-term storage capability against spoilage or microbiological contamination with or without refrigeration and can be used in prepared food to reduce or eliminate special handling needs for microstability purposes, e.g. high temperature requirements for steam tables.

It was a further object of the invention to develop a bland sauce base that can be combined with a number of flavoring and other ingredients, including natural ingredients, that replace or reduce the need or amount for "mise en place" preparation of sauces for foods by a chef or cook during food preparation without significant, if any, addition of artificial ingredients, preservatives and ingredients not conventionally found in corresponding freshly prepared sauces.

It was yet another object of the invention to develop a universal sauce base with a heat stable emulsion.

It was another object of the invention to develop a universal sauce base with an emulsion that is freeze-thaw tolerant.

These objects and others have been achieved by the universal sauce base comprising phospholipase A2 modified egg yolk and an acidulent comprising at least inorganic acid, including at least phosphoric acid. The universal sauce base is bland in taste, has microbiological stability and has an oil-in-water emulsion that is heat stable and freeze-thaw tolerant. The universal sauce base can be designed to have no sourness, in that it has no organic acid and does not impart sour flavor attributes to foods prepared with the universal sauce base.

In the present specification, all parts and percentages are by weight/weight unless otherwise specified.

SUMMARY OF THE INVENTION

The invention pertains to an edible composition, which is referred to herein as a universal sauce base, that has bland and non-sour flavor attributes for use in a wide variety of foods either alone or with a sundry of flavorings, natural ingredients or other ingredients. The universal sauce base is microbiologically stable, comprises a heat stable oil-in-water emulsion and is freeze-thaw tolerant. The universal sauce base has particular utilities in the food service industry, as an ingredient in retail food products and in home use.

The universal sauce base comprises an oil-in-water e phospholipase A2 enzyme modified egg yolk and acidulent, and may further comprise xanthan gum, sweetener, egg white, antioxidants, antimycotic agents, such as benzoic acid or sorbic acid, additives, fillers and the like and combinations thereof. The universal sauce base can also comprise or be combined with salt, spices, flavoring agents and the like or combinations thereof.

The universal sauce base is heat stable in that it can be pasteurized and heated during food preparation without experiencing emulsion break. The universal sauce base is also freeze-thaw tolerant, and as such can be frozen for a period of time greater than experienced with mayonnaise or other sauces, for example up to about 4 weeks without emulsion break. The universal sauce base is microbiologically shelf stable and safe for consumption in its original sealed package and can be stored after opening with or without refrigeration thus reducing the need for special handling requirements compared to conventional food ingredients, like sauces either freshly prepared at the time of cooking or reconstituted from powdered or dry formulations. Among the numerous attributes-of the universal sauce base is that it can replace or significantly reduce the need or amount of "mise en place" preparation of sauces by the cook or chef at the time of food preparation, including preparation from natural ingredients and/or reconstitution of dry formulations. In addition, the universal sauce base is lethal to pathogens, common spoilage, bacteria, yeast and molds, and when incorporated into prepared foods, such as institutional meals in cafeterias or a catering environment, the microbial stability reduces or eliminates special handling requirements.

The universal sauce base can be made by batch or continuous processes that provide for a good emulsion among the water, oil and modified egg yolk. A critical element of the universal sauce base, particularly for its heat stability characteristics, is the ability to obtain a good emulsion and if this is not achieved, the finished product will not be heat stable even though the egg material is heat stable. A good emulsion can be achieved by conventional mixing of the ingredients, milling in a unit such as a colloid mill or combining the ingredients in a mixer-emulsifier or other similar device.

The universal sauce base is characterized as having a bland flavor, which is clean and delicate having flavor attributes associated with sauces rather than mayonnaise. The universal sauces base, however, has pH levels normally associated with acidic environments. The universal sauce base will not contribute sourness to delicate applications where sourness is detrimental. The universal sauce base can be mixed with natural or artificial flavorings or ingredients to make a wide variety of freshly prepared or processed foods, and can be used as a thickener in soups, gravies, flavored sauces and the like.

DETAILED DESCRIPTION OF THE INVENTION

The universal sauce base comprises from about 30% to about 80% water, about 5% to about 55% fat, such as vegetable oil, about 3% to about 8.0% liquid phospholipase A2 enzyme modified unsalted or salted egg yolk (about 1.5% to about 4.0% egg yolk solids, i.e. dry phospholipase A2 modified egg yolk solids, on a dry weight basis excluding added salt and adjuvants found in commercially available egg yolk products), about 3% to about 5.5% thickener, e.g. starch, and about 1% to about 3% acidulent comprising at least inorganic acid including at least phosphoric acid. The amount of added acid is that necessary to achieve a pH of about 2.5 to 4.0. The universal sauce base may further comprise optional ingredients selected from the group consisting of sweetener, about 0.05% to about 0.4% xanthan gum, up to about 80 ppm EDTA, up to about 0.1% antimycotic agents, such as benzoic acid or sorbic acid, up to about 6% liquid egg whites (up to about 0.72% egg white solids on a dry weight basis), additives, fillers and the like, and combinations thereof. The universal sauce base can be combined with salt, spices, flavoring agents or combinations thereof for taste and/or particular applications. Specific applications of the universal sauce base are discussed in the Examples.

In an embodiment of the invention, the universal sauce base comprises no organic acid, such as vinegar acidulent, i.e. has no acetic acid. Typical characteristics for the universal sauce base with no vinegar are set forth in Table 1.

TABLE 1

| Analytical Characteristics | Range |
| --- | --- |
| 1. % Oil | about 32.0–about 34.0 |
| 2. % Moisture | about 58.5–about 56.5 |
| 3. % Salt | about 1.9–about 2.1 |
| 4. % Acidity (as acetic) | 0 |
| 5. pH | about 2.5–about 3.4 |
| 6. Viscosity (Haake) | |
| Yield Stress (dynes/cm) | about 1,000 to about 3,200 |
| Viscosity @ 10 1/s (centipoise) | about 14,000 to about 38,000 |
| 7. Bulk Density | about 1 kg/liter |

In other embodiments of the invention, the acidulent comprises small amounts of vinegar and/or other organic acid, in combination with the inorganic acid. In this embodiment, the universal sauce base will have sour flavor attributes but remains bland in flavor and will not impart sourness in food applications. Typical characteristics for the universal sauce base of this embodiment are set forth in Table 2.

TABLE 2

| Analytical Characteristics | Range |
| --- | --- |
| 1. % Oil | about 32.0–about 34.0 |
| 2. % Moisture | about 58.5–about 56.5 |
| 3. % Salt | about 1.9–about 2.1 |
| 4. % Acidity (as acetic) | about 0.24–about 0.26 |
| 5. pH | about 2.5–about 3.4 |
| 6. Viscosity (Haake) | |
| Yield Stress (dynes/cm) | about 1,000 to about 3,200 |
| Viscosity @ 10 1/s (centipoise) | about 14,000 to about 38,000 |
| 7. Bulk Density | about 1 kg/liter |

The preferred yield stress for the formulations of Tables 1 and 2 is about 2,500 dynes/cm to about 3,000 dynes/cm and the preferred viscosity is about 25,000 to about 35,000 centipose. The universal sauce base may have a consistency of nearly pourable to very thick paste depending on the desired end use.

The universal sauce base may be combined with spices, flavorings and other ingredients for particular applications. For example, the universal sauce base may be combined with spices to obtain sauces for pasta or grains. These sauces can then be combined with pasta and grains thereby not requiring the chef to freshly prepare sauces when making a pasta dish. Examples of such sauces are tomato herb and pesto sauces, and product characteristics for the universal sauce base with added spices and other ingredients for tomato herb and pesto sauces are set forth in Tables 3 and 4. The viscosity of the universal sauce bases of Tables 3 and 4 will be similar to, but slightly thinner than, the viscosities of the universal sauce bases of Tables 1 and 2.

TABLE 3

(Tomato Herb)

| Analytical Characteristics | Range |
| --- | --- |
| 1. % Oil | about 26–about 27.5 |
| 2. % Moisture | about 60–about 63 |
| 3. % Salt | about 1.9–about 2.1 |
| 4. % Acidity (as acetic) | about 0.24–about 0.26 |
| 5. pH | about 3.1–about 3.3 |

TABLE 4

(Pesto)

| Analytical Characteristics | Range |
| --- | --- |
| 1. % Oil | about 31.0–about 33.5 |
| 2. % Moisture | about 57.3–about 55.4 |
| 3. % Salt | about 2.7–about 2.9 |
| 4. % Acidity (as acetic) | about 0.24–about 0.26 |
| 5. pH | about 3.1–about 3.3 |

The universal sauce base is heat stable, freeze-thaw tolerant and microbiologically stable at room temperature. It is also stable toward reduction (removal of water) and re-dilution during cooking due to the thickeners (e.g. starch) in the formula which manage the water in the food, acting as a binder and providing a creamy visual texture and mouthfeel. The universal sauce base is suitable for all temperature applications and can be cooled down or heated without changing consistency unlike most other sauces in the art which tend to thicken when cooled. The universal sauce base is retortable.

Any vegetable oil can be used in the universal sauce base, including those selected from the group consisting of soybean oil, sunflower oil, canola oil (low erucic rapeseed oil), cottonseed oil, corn oil and the like, and combination thereof. More freeze tolerant oils, such as sunflower oil or canola oil, either in total or blended with other oils, will increase the emulsion freeze break resistance of the universal sauce base and create a more freeze tolerant product. Fat replacement or mimetic compositions, such as fatty-acid esterified propoxylated glycerols and fat mimetics comprising esterified propoxylated monoglycerides and diglycerides and the like, may be used in place of or with the vegetable oil in the universal sauce base, with appropriate formula adjustments to compensate for differences in physical and emulsifying properties of these ingredients relative to natural fats and oils.

Both non-modified and modified starches may be used in the universal sauce base as thickeners, and also instant starch or cook-up starch. Any starch acceptable for food applications can be used, such as corn, waxy cornstarch, potato, rice, tapioca, wheat or combinations thereof, including both the non-modified and modified versions of these starches, as well as instant and cook-up versions of these starches. The preferred starch is waxy cornstarch. Commercially available instant starches such as ULTRASPERSE® M available from National Starch and Chemical Company, Bridgewater, N.J., USA may be used to advantage. The level of starch in the universal sauce base formulation can be adjusted to affect viscosity of the universal sauce base, which alters the textural qualities of the product. The viscosity can be varied to produce a product within the spectrum from pourable to a thick paste. The starch, however, must be stable towards hydrolysis in acid environments to prevent viscosity thinning over time (shelf life at ambient conditions and stability toward heating under cooking conditions). Another important function of the starch is the ability of the starch to bind the water, which allows the universal sauce base to be stable towards reduction and re-dilution because the starch manages the water.

Any sweeteners acceptable for food applications may be used in the universal sauce base. The universal sauce base can be sweetened to taste, but preferably comprises up to about 4% sweeteners. Sweeteners include those selected from the group consisting of sucrose, glucose, saccharin, dextrose, levulose, lactose, mannitol, sorbitol, fructose, maltose, xylitol, saccharin salts, thaumatin, D-tryptophan, dihydrochalcones, acesulfame, cyclamatic salts and the like, and combinations thereof. The preferred sweetener is sucrose.

The pH of the universal sauce base is between about 2.5 to about 4.0, preferably about 2.8 to about 3.0. The pH of the universal sauce base is acidic which imparts microbiological stability such that the universal sauce base is appropriate for long term storage. Because the use of vinegar, i.e. acetic acid, is eliminated or substantially reduced, the universal sauce base does not have sour taste and will not add sour flavor attributes when used in foods. The universal sauce base provides a food ingredient comprising an emulsion that has widespread use but is microbiologically stable, in part, from its low pH.

In addition to the phosphoric acid, edible inorganic acids, dependent upon pH and taste requirements, useful in the universal sauce base include those selected from the group consisting of sulfuric acid, hydrochloric acid and the like and combinations thereof. The phosphoric acid, as well as other inorganic acids, will not cause sour attributes to the universal sauce base. In preferred embodiments of the invention, the acidulent comprises no organic acid, such as acetic acid (vinegar), however, in certain embodiments of the invention, the universal sauce base will comprise low levels of organic acids, such as acetic acid, citric acid, lactic acid, adipic acid, malic acid, tartaric acid and the like and combinations thereof. The amount of organic acid in the universal sauce base is limited by pH and taste requirements. The selection of an inorganic acid in the formulation provides a low pH for microbial stability without sour taste that results from conventional use of organic acid to control pH.

The heat stability against emulsion break is attributed to the use of phospholipase A2 modified egg yolk as the emulsifying agent in the universal sauce base. Phospholipase A2 is generally available in both liquid and powdered form, and when used in powdered form, the modified egg yolk can be reconstituted in a number of ways, such as with water before being incorporated into the universal sauce base or suspending the powder egg yolk in part of the oil and hydrating the egg during the mixing process when making the universal sauce base. Phospholipase A2 modified egg yolk is available from M. G. Waldbaum Company, Gaylord, Minn., USA. Phospholipase A2 modified egg yolk is also available from Inova Food Ingredients USA, Inc., Spencer, Iowa, USA, Belovo SA, Bastogne, Belgium and elsewhere.

Phospholipase A2 is an enzyme that modifies the egg yolk by hydrolysis of the lecithin to lysolecithin. Phospholipase A2 can be obtained from porcine pancreas or may be a microbial enzyme. Phosphoipase A2 is available from Novo Nordisk Biochem North America, Inc., Franklinton, N.C., USA under the trademark LECITASE™. Calcium is generally a required cofactor to hydrolyze the lecithin of egg yolk, and there is usually enough calcium present in commercial egg yolk to satisfy the calcium requirement for the enzyme. Phospholipase A2 enzyme affect the hydrolysis of the fatty acid on a phospholipid at the middle or 2 position of the glycerol moiety replacing it with an OH group thereby converting the lecithin in the egg yolk to lysolecithin. For purpose of the universal sauce base, modified egg yolk having about 30% to about 95% conversion, preferably about 60% to about 90% conversion, is used. The level of conversion of the modified egg yolk is important to achieving the heat stability of the universal sauce base.

Although the inventors do not wish to be bound to any theory, it has been theorized that the lysolecithin stabilizes the emulsion in two ways. One theory provides that lysolecithin is a better emulsifier of the oil phase than normal egg lecithin resulting in smaller oil droplets creating a more stable emulsion. Another theory is based on the concept that emulsions are thermodynamically unstable, meaning that given enough time the emulsion will spontaneously breakdown. Lysolecithin interacts more strongly than lecithin with the lipoprotein of egg yolk probably aiding in binding the protein more strongly to the oil droplet thereby covering the droplet with a more uniform and elastic protein coat. This has been said to stabilize the emulsion droplet against a wide range of physical stresses, and prevents protein bound to the surface of the droplet from denaturing to such an extent that it coagulates away from the droplet under heat stress.

The universal sauce base is stable toward emulsion breakage (at about 90° C. for up to about 1 hour or at about 120° C. for up to about 15 minutes). Also, the universal sauce base is stable towards microwave cooking and can be used in microwave cooking applications, is retortable and will remain stable from microbial spoilage while on a steam table for long periods of time. These properties allow the universal sauce base to be used in all manner of cooking application typically encountered in food service, such as creamy, hot pasta sauces, as an ingredient in freshly prepared foods and the like. It can also be used as a heat stable food ingredient to make retorted meat and vegetable salads and sandwich spreads, such as tuna or chicken salad, potato salad and the like. The universal sauce base also has the ability to withstand retorting, heating in direct contact with a hot skillet or cooking pan or heating under a salamander (broiler).

One of the advantages of the universal sauce base is that it can be used to make sauces thus not requiring the time needed for a chef or cook to make freshly prepared sauces or reconstitute powdered sauces. For example, the universal sauce base is ready to use, while powdered sauces require significant work, time and skill to prepare. In addition, large mixing equipment must be available to make large batches of freshly prepared or reconstituted sauces, and the equipment must be cleaned at the end of preparation to maintain the equipment in good and safe working order. Powered sauce must either be used within a short time in the finished application or they must be maintained at elevated temperatures (about 165° F.–185° F.) to inhibit microbial growth. The unused material must be discarded or incorporated into a stable application after a very short time (typically about 1–2 days) and even when incorporated into a stable application, may need special handling requirements for microbial stability. On the other hand, the universal sauce base can be used as needed, with the unused portion returned to the shelf or refrigerator until needed for the next application.

The universal sauce base has numerous benefits including that it is convenient and simple to use by saving time and labor, for example by eliminating any reduction step or "mise en place" preparation required to make a freshly prepared sauce. The universal sauce base produces nearly the same texture with each use. The universal sauce is also desirable because it exhibits excellent binding capacity in that the universal sauce base will bind solid particles together as well as excess water in the finished food.

The universal sauce base can be used in a wide variety of food applications, by mixing or combining with natural and artificial flavorings and other ingredients. In particular, the universal sauce base can be used in food service operations and because the universal sauce base is microstable, it can be stored with or without refrigeration for longer periods of time than freshly prepared sauces or sauces reconstituted from dry ingredients. Thus, for the home consumer or restaurateur, the universal sauce base should allow for less raw ingredient requirements, less waste and greater economy.

The universal sauce base can be made by combining the following ingredients: about 30% to about 80% water, about 5% to about 55% fat, e.g. vegetable first oil, about 3% to about 5.5% thickeners, e.g. starch, about 3% to about 8% liquid phospholipase A2 modified unsalted or salted egg yolk or, alternatively, about 1.5% to about 4.0% (on a dry weight basis) dry phospholipase A2 modified egg yolk solids, and about 1% to about 3% acidulent in means for mixing, such as institutional and industrial mixers, like those generally available from Hobart Corporation, Troy, Ohio, USA, and then mixing the ingredients. In addition, the optional ingredients may be added to the combined ingredients prior to mixing, or may be added after the combined ingredients are mixed. The ingredients must be mixed for sufficient time to create an oil in water emulsion. Some of the dried ingredients may require hydration separately from the other ingredients, prior to introduction into the mixer, to avoid lump formation.

The invention will now be described with respect to some non-limiting examples, it being understood that the universal sauce base can be used in formulation with nearly an unlimited number of and variety of flavorings or other ingredients to make sauces, thickeners, binders or ingredients for food.

EXAMPLES

Examples 1–4

Four sauces were prepared employing the universal sauce base. These sauces are the universal sauce base comprising no organic acid (i.e. without vinegar) (Example 1), a sour universal sauce base comprising acetic acid (i.e. with vinegar) (Example 2), tomato-herb sauce (Example 3) and pesto sauce (Example 4). The compositions of the four sauces are set forth in Tables 5–8, respectively. The universal sauce bases of Examples 1 and 2 may be used alone or allow the chef or cook to add their own flavorings and ingredients for their own flavor signature and/or to meet the changing needs of their menus. The tomato-herb sauce (Example 3) and pesto sauce (Example 4) comprise the universal sauce base of Example 1 and demonstrate the addition of flavorings to the universal sauce base composition for specific food applications such as pasta dishes or pizza.

TABLE 5

Formulation for Universal Sauce Base Without Vinegar

Batch Size: 8000 grams Formula

| Ingredient | Weight-% | Weight-g |
|---|---|---|
| WATER | 55.6 | 4445.7 |
| Liquid Soybean Oil | 32.5 | 2600 |
| Starch - ULTRASPERSE ® M | 4.4 | 352 |
| Sucrose (dry) | 2.8 | 224 |
| Lecitase Modified Commercial Egg Yolk (10% salt) | 2.50 | 200 |
| Salt | 1.70 | 136 |
| Phosphoric Acid (85%) | 0.12 | 9.7 |
| Flavors | 0.1 | 8 |
| Inosine Monophospate (IMP) | 0.1 | 8 |
| Sorbic Acid | 0.1 | 8 |
| Xanthan Gum (KELTROL ® F available from Monsanto Company, St. Louis, Missouri, USA). | 0.1 | 8 |
| CaNa$_2$EDTA | 0.008 | 0.6 |
| Total | 100.0 | 8000 |

TABLE 6

Formulation for Universal Sauce Base With Vinegar

Batch Size: 8000 grams Formula

| Ingredient | Weight-% | Weight-g |
|---|---|---|
| WATER | 54.8 | 4382 |
| Liquid Soybean Oil | 32.5 | 2600 |
| Starch - ULTRASPERSE ® M | 4.4 | 352 |
| Sucrose (dry) | 2.8 | 224 |
| Enzyme modified liquid egg yolk (10% salt) (M. G. Waldbaum) | 2.5 | 200 |
| Salt | 1.7 | 136 |
| Vinegar (12% Acetic Acid) | 0.8 | 64 |
| Phosphoric Acid (85%) | 0.1 | 9 |
| Flavors | 0.1 | 8 |
| Inosine Monophospate (IMP) | 0.1 | 8 |
| Sorbic Acid | 0.1 | 8 |
| Xanthan Gum (KELTROL ® F) | 0.1 | 8 |
| CaNa$_2$EDTA | 0.008 | 0.6 |
| Total | 100.0 | 8000.0 |

TABLE 7

Formulation For Tomato Herb Sauce

Batch size 8000 g Formula

| INGREDIENT | Weight-% | Weight-g |
|---|---|---|
| Water | 45.5 | 3640 |
| Soybean oil | 26.8 | 2147 |
| tomato paste | 16.5 | 1320 |
| STARCH - ULTRASPERSE ® M | 3.5 | 280 |
| Sucrose | 2.3 | 184 |
| Lecitase ™ Modified Commercial Egg Yolk (10% salt) | 2.1 | 168 |
| Sodium Chloride | 1.4 | 112 |
| Basil flakes | 0.3 | 24 |
| Garlic powder | 0.3 | 24 |
| Oregano flakes | 0.3 | 24 |
| Sorbic acid | 0.08 | 6.4 |
| Xanthan gum (KELTROL ® F) | 0.08 | 6.4 |
| 85% Phosphoric acid | 0.3 | 24 |
| Inosine Monophospate (IMP) | 0.08 | 6.4 |
| White pepper | 0.016 | 1.3 |
| Black Pepper | .08 | 6.4 |
| Rosemary powder | 0.014 | 1.1 |
| CaNa$_2$EDTA | 0.006 | 0.5 |
| Total | 100 | 8000 |

TABLE 8

Formulation For Pesto Sauce

Batch size 8000 g Formula

| INGREDIENT | Weight-% | Weight-g |
|---|---|---|
| Water | 54.5 | 4360 |
| Soybean oil | 32 | 2560 |
| Starch - ULTRASPERSE ® M | 4.3 | 344 |
| Sucrose | 2.7 | 216 |
| 85% Phosphoric Acid | 0.13 | 10.4 |
| Lecitase Modified Commercial Egg Yolk (10% Salt) | 2.4 | 192 |
| Pesto Seasoning FA 1036 (McCormick & Company, Inc., Hunt Valley, Maryland, USA) | 1.9 | 152 |
| Salt | 1.6 | 128 |
| Basil Flavor | 0.1 | 8 |
| Sorbic Acid | 0.1 | 8 |
| Xanthan Gum (KELTROL ® F) | 0.1 | 8 |
| Inosine Monophospate (IMP) | 0.1 | 8 |
| White Pepper | 0.019 | 1.5 |
| CaNa2EDTA | 0.008 | 0.6 |
| Total | 100 | 8000 |

Each sauce having the composition of ingredients set forth in Tables 5–8 were made separately in accordance with the following procedure using a bench top Hobart mixer available from Hobart Corporation equipped with a 12 quart bowl and corresponding whisk. The starch, ULTRASP-ERSE® M, was added slowly into the water at Speed 1. After the starch was dispersed into the water, the phosphoric acid, sorbic acid and, where applicable, vinegar, were added to the mixer and mixing at Speed 1 continued. Then, a previously prepared gum blend and sweetener (sucrose) were added to the Hobart mixer, and mixing continued for 2 minutes at Speed 1. Subsequently, the egg yolk, salt, $CaNa_2EDTA$ and IMP were added and mixing at Speed 1 continued until the mix was uniform. Once the mix was uniform the speed was increased to Speed 2 and the soybean oil was added, slowly, and mixing continued at Speed 2 until the mix was uniform. The flavorings were then added and mixing continued until the mix was uniform. Finally, the fine particulates, such as the seasonings, pepper, salt, flakes, powders and the like, were added and mixing continued at Speed 2 until the mix was uniform.

Example 5

In this example, the universal sauce base is used to make an alfredo sauce. A universal sauce base having the compositions of either Example 1 or Example 2 can be used for this application. To make the alfredo sauce, the following ingredients were combined.

Ingredients—

1. 500 grams universal sauce base
2. 475 grams water
3. 95 grams grated Parmesan Cheese
4. 290 grams cooked pasta (any shape)

Preparation—Combine universal sauce base and water, heat to boiling point. Add cheese and toss with cooked pasta.

Example 6

In this example, the universal sauce base is used to make a parma rosa sauce. A universal sauce base having the compositions of either Example 1 or Example 2 can be used for this application. To make the parma rosa sauce the following ingredients were combined:

Ingredients—

1. 500 grams universal sauce base
2. 250 grams water
3. 225 grams tomato sauce (REDPACK® California Style from Tri-Valley Growers, San Francisco, Calif., USA)
4. ½ Tbs. chopped fresh basil
5. 25 grams parmesan cheese
6. 290 grams cooked pasta Preparation—Combine the universal sauce base, water and tomato sauce in a pan. Heat to boiling point. Add basil and cheese and toss with cooked pasta.

The applications in Examples 5 and 6 are both quick and easy to prepare. In both cases, the universal sauce base enhances the dish by coating the pasta (visual appeal), carrying the flavor and providing a moistness and lubricity in the mouth that is reminiscent of freshly prepared sauces or reconstituted powdered sauces of similar respective varieties. The heat stability of the universal sauce base is very forgiving in the saucing process, and it is very resistant to emulsion breakage (oil separation) if it is reduced too far and it readily recovers texture when the moisture is replaced.

Example 7

In this example, the universal sauce base is used as a creamy sauce/binder in a cold oriental chicken salad. A universal sauce base having the compositions of either Example 1 or Example 2 can be used for this application. To make the oriental chicken salad the following ingredients were combined:

Ingredients—

1. 350 grams diced cooked chicken breast
2. 140 grams diced mixed bell pepper
3. 50 grams diced celery
4. 50 grams diced pineapple, fresh or canned
5. 250 grams universal sauce base
6. 100 grams milk, mixed with the universal sauce base
7. 6 grams mixture of spices such as: lemon pepper, Indian curry, garlic (granulated) and salt.

Preparation—Toss all the ingredients together in a large bowl.

In this example, the universal sauce base clings to the salad components well producing a smooth, creamy coating that is appealing to the eye. The universal sauce base readily handles the excess moisture from the other ingredients.

Example 8

In this example, the universal sauce base is used as a base sauce for preparing a fresh hot parmesan artichoke vegetable dip. A universal sauce base having the composition of Example 2 can be used for this application. The following ingredients were combined to make the dip.

Ingredients—

1. 200 grams universal sauce base
2. 3 grams KNORR® Pesto (dry sauce mix—available from the assignee of the invention)
3. 10 grams Parmesan Cheese Powder (from LAND O'LAKES®, Arden Hills, Minn., USA)
4. 0.06 gram white pepper
5. 4 cloves roasted garlic
6. Two 14-ounce cans of artichoke hearts, drained Preparation—Combine all ingredients in the bowl of a food processor and process until smooth. Place mixture in a greased 2-quart baking dish and bake at 350° F. for 3 hour or until heated through. Serve on Melba toast.

In this example, the universal sauce base binds the other ingredients together, imparting a spreadable texture. It also is bland and takes on the flavor of the other ingredients without adding a flavor of its own and does not impart sources to the dip.

Example 9

In this example, the universal sauce base is used as a replacement for milk and flour in making gratin vegetables, specifically cauliflower gratin. A universal sauce base having the composition of Example 1 can be used for this application. To make cauliflower gratin, the following ingredients were combined:

Ingredients—

1. One head cauliflower, cut into florets and cooked until tender
2. 200 grams universal sauce base
3. 100 grams water
4. 15 grams Cheeze-zing (from Kraft Foods, North America, Northfield, Ill., USA)
5. 5 grams Accel 400 Cultured Dairy Solids (from Quest International Flavors and Food Ingredients Co., Norwich, Conn., USA)

6. 0.1 gram cheddar cheese flavor (from Firmenich Incorporated, Princeton, N.J., USA)
7. 0.5 gram salt
8. 0.25 gram Monosodium glutamate (MSG)
9. 0.05 gram mustard powder Preparation—

1. Combine universal sauce base, water, Cheeze-zing, Accel, cheddar cheese flavor, salt, MSG and mustard powder in a saucepan.
2. Heat and stir bringing to a boil.
3. Place cooked cauliflower in a greased 9" square-baking pan.
4. Pour sauce over cauliflower and stir to combine.
5. Bake at 350° F. for ¼ hour to heat through.

In this example, the universal sauce base works well in a gratin as a replacement for milk and flour due to its heat stability. The color, texture and flavor of the resulting gratin are almost identical to that prepared with conventional ingredients. In addition to the cauliflower of this example, the universal sauce base can be used for potato and broccoli gratin, as well as other vegetables.

Example 10

In this example, the universal sauce base is used as to make creamy vegetables, specifically creamed cauliflower. A universal sauce base having the composition of Example 1 can be used for this application:
Ingredients—

1. 250 Grams Broccoli florets
2. 100 grams universal sauce base

Preparation—

1. Wash and drain the broccoli, place in a microwaveable bowl.
2. Add the universal sauce base and stir.
3. Cover with plastic wrap.
4. Microwave on high power for 5 to 6 minutes, or until broccoli is desired level of tenderness.
5. Stir to distribute sauce and serve.

In this example, the universal sauce base provides convenience to the cook or restaurant chef while at the same time producing high quality cream style fresh cooked vegetables.

Example 11

In this example, the universal sauce base replaces a panade as a binder. A universal sauce base having the compositions of either Example 1 or Example 2 can be used for this application.

Classical preparation of a panade is time consuming and labor intensive. A classic panade is prepared by soaking breadcrumbs in milk, preparing and adding seasonings (e.g., fresh celery and onions) and blending the panade into a recipe. Using universal sauce base in place of a panade results in cost and time savings and does not require the use of skilled labor.

The universal sauce base can also replace other binders such as whole egg or egg yolk, roux and mayonnaise. Conventional egg based emulsions break under heat and eggs are perishable. A roux is labor intensive to prepare, expensive to buy, requires skill to prepare and use, has a limited shelf life (weeks under refrigeration) and is not microstable. Mayonnaise has limited use because it is not typically heat stable, not compatible with many recipes from a flavor point of view and may impart sourness to food.

Use of the universal sauce base as a binder in place of a panade for crab cakes is described below:
Ingredients—

1. 2 shallots, very finely chopped
2. 2 stalks celery, very finely chopped
3. 1 Tbs. oil
4 . 2 Tbs. dry White wine
5. 1 lb. lump crabmeat (carefully cleaned to remove residual cartilage and shell pieces)
6. ¼ cup chopped parsley
7. 2 Tbs. lemon juice
8. ¼ cup universal sauce base
9. 2 cup fresh white bread crumbs
10. salt and pepper
11. 2 eggs
12. Flour
13. 1 cup fine dry bread crumbs (without seasoning)
14. Oil for frying Preparation—

1. Prepare fresh bread crumbs by cutting away the crust from 3 slices of white bread, breaking the remaining bread into chunks and chopping in a food processor to a medium fine consistency.
2. Sauté shallots and celery in oil in an 8 inch frying pan. Add wine and cook until shallots and celery are softened. Set aside to cool, then combine with crabmeat, parsley, lemon juice, universal sauce base and fresh bread crumbs. Add salt and pepper and blend thoroughly. Shape into crab cakes and chill for 2 hours.
3. Beat a little water with the egg in a shallow bowl. Place flour on a sheet of waxed paper, and dry bread crumbs on another. Pat flour over each crab cake, then dip in egg and pat with crumbs. Refrigerate crab cakes 2 hours, or until needed.
4. In a heavy, deep, skillet or saute pan, heat about ¾ inch of oil until shimmering, or if tested with a thermometer, 375° F. Slip crab cake into the hot oil one cake a time and cook on each side until well browned.

Example 12

In this example, the universal sauce base is used as a thickening white sauce in a New England-type clam chowder. The universal sauce base can be used as a thickening white sauce in a number of creamy style soups and in sweet baked goods. In these applications it is imperative that the thickener does not contribute any sourness to the final application and the universal sauce base must re-create the soft, opaque, creamy white texture typically seen in these applications while not contributing sourness. A universal sauce base having the composition of Example 1 is generally preferred for these applications and was used to prepare the New England-type clam chowder described below
Ingredients—

1. 360 grams fine diced Spanish onions
2. 180 grams fine diced celery
3. ½ cup (125 ml) corn oil
4. 1000 grams universal sauce base
5. 610 grams clam juice 6. 500 grams medium diced cooked and peeled chef potatoes
7. 200 grams chopped clams Preparation—
1. Sweat onions and celery in corn oil for 5–7 minutes.
2. Add universal sauce base and clam juice, stir well and bring to a boil.
3. Reduce heat and simmer for about 8–10 minutes.
4. Add clams and potatoes, simmer 2–3 minutes to heat through.

The New England-type clam chowder has a smooth creamy white texture reminiscent to freshly prepared chowder. There is no sourness or a typical flavors noted in the chowder prepared with the universal sauce base.

Example 13

In this example, the universal sauce base is used in a sweet baking application, to prepare a Tira Misu pastry. A universal sauce base having the composition of Example 1 was used for this application. The Tira Misu was made by combining Zabaione, syrup and main components as discussed below:

Zabaione
Ingredients—

1. 125 gram Dry Marsala wine
2. 100 grams sugar
3. 500 gram universal sauce base Preparation of the Zabaione—Melt sugar in Marsala wine and heat to cook off some alcohol. Cool and mix with universal sauce base.

Syrup
Ingredients—

1. 3 Tbs. water
2. ¼ cup sugar
3. ¼ cup dark rum
4. ¼ cup espresso

Preparation of the syrup—combine ingredients in a bowl and mix.

Main Components
Ingredients—

1. ½ lb. Mascarpone cheese
2. 14 ounce package Savoiardi (Italian Ladyfingers) r
3. ¼ cup cocoa
4. 1 Tbs. confectioners sugar.

Preparation of Tira Misu pastry—

1. Make Zabaione and set aside.
2. Make syrup and set aside.
3. Whip Mascarpone to soften then fold in Zabaione.
4. Arrange half of the Savoiardi in a 9×13 inch-baking dish. Drizzle on half of the syrup. Spread on half of the Mascarpone/Zabaione mixture.
5. Arrange remaining Savoiardi in dish and repeat layering process.
6. Sift cocoa with confectioners sugar.

In this application, universal sauce base replaces part of the expensive Marscarpone cheese component to yield a commercially acceptable product at a cost savings to the restaurant or baker.

Example 14

In this example, the flavored universal sauce base having the composition of Example 3 is used in a topping application for pizza. Pizza using the universal sauce base and commercially available BOBOLI® pizza crusts is prepared as follows.

Ingredients—

1. Two 14-inch pizza crusts (BOBOLI® from Kraft Foods, North America)
2. 300 grams of the tomato herb universal sauce base made in accordance with Example 3
3. 300 grams shredded mozzarella cheese
4. 150 grams grated parmesan cheese Preparation—Spread BOBOLI® pizza crusts evenly with the universal sauce base, top with cheese and bake at 400° F. for about 30 minutes or until cheese is melted and browned.

Example 15

In this example, the flavored universal sauce base having the composition of Example 4 is used as an ingredient in making a pesto focaccia. The pesto focaccia is made as follows.

Ingredients—

1. 2 cups 110° F. water
2. 1 tsp. sugar (optional to taste)
3. 1 package dry yeast
4. 1 Tbs. kosher salt
5. 4 to 5 cups unbleached all purpose flour
6. ⅛ cup olive oil, plus more for the pan
7. ⅓ cup of the pesto universal sauce base made in accordance with Example 4

Preparation—

1. Pour warm water into a large bowl, stir in sugar, then sprinkle on yeast. When yeast has proofed, vigorously stir in about 3 cups of the flour and the kosher salt. Allow dough to rise, covered in a warm place for about 2 hours.
2. Mix together the oil and the universal sauce base. Gradually mix half of the oil/universal sauce base mixture into the risen dough, then briskly stir in most of the flour to create soft, sticky dough.
3. Dump the sticky dough out onto a floured surface and knead, just until it holds together well and can be formed into a round ball that flattens as it sits.
4. Pour a little oil onto a heavy baking sheet and place the dough in the center. Cover with plastic wrap and rise in a warm place about 2 hours or until doubled.
5. Press the dough out to fill the baking sheet, cover again (for example, in a plastic sweater storage box) and allow to rise again until about 1 inch thick (about 45 minutes in a warm place). Pre-heat oven to 450° F.
6. Create little indentations in the dough and spread remaining oil/universal sauce base mixture on top. Bake in center of oven for about ½ hour or until focaccia is nicely browned and crisp underneath.

Example 16

In this example, the universal sauce base serves as a cheese replacement and a binder, for a lasagna dish. The universal sauce base replaces a substantial portion of the Ricotta cheese which is an expensive ingredient with a limited shelf life. In the recipe described below, the universal sauce base having the composition of Example 2 is used to make roasted vegetable lasagna. The universal sauce base separates the pasta layers and provides moisture and lubricity, as well as carrying the flavor of the dish.

Ingredients—

1. Roasted Vegetables:
   a. 4 small zucchini
   b. 2 Red peppers
   c. 1 green pepper
   d. 2 medium eggplants
   e. 12 ounces Portobello mushrooms
   f. 2 sweet onions
2. 2 cans plum tomatoes
3. 1 Box lasagna noodles, cooked
4. 500 grams Ricotta cheese
5. 750 grams universal sauce base
6. 150 grams grated parmesan cheese Preparation—

1. Cut vegetables into pieces, toss with oil and roast at 425° F. until softened.
2. Cook tomatoes until reduced by ⅓. Mix together cheeses and universal sauce base.
3. Layer up in a greased 9×13 inch pan: tomatoes, noodles, vegetables and the cheese/universal sauce base mixture. Use three layers of noodles and three layers of vegetables, top with a layer of noodles and a layer of cheese/universal sauce base mixture.
4. Bake at 375° F. for 1 hour. Allow to stand 15 minutes before serving.

Example 17

In this example, the universal sauce base is used as a baking ingredient. This use can save time and cost, simplify the recipe, reduce the skill level required for making a baked product and/or improves the functionality of the recipe. Universal sauce base having the composition of Example 1 is used in conventional restaurant preparation of pancakes as described below.

Ingredients—

1. 100 grams flour
2. 2 grams salt
3. 1 gram baking soda
4. 75 grams of the universal sauce base
5. 175 grams milk Preparation—

1. Sift together flour, salt and baking soda into a large mixing bowl.
2. Mix together the universal sauce base and milk. Dump universal sauce base and milk mixture into flour, salt and baking soda mixture and stir briefly.
3. Cook pancakes on a skillet or griddle.

In this application, the universal sauce base replaces eggs and oil. The universal sauce base in this application inhibits gluten formation by coating the flour and prevents the pancake from becoming rubbery if the batter is over stirred or stirred too long and also prevents the pancake from drying out on a steam stable.

Example 18

In this example, the universal sauce base is used as a heat stable sauce to replace low fat mayonnaise dressings to prepare retorted salads. Any universal sauce base can be used in these types of applications, however, in replacing mayonnaise or mayonnaise-type dressing, universal sauce base having the composition of Example 2 is preferred. For example, retorted tuna salad was prepared with the universal sauce base of Example 2 as follows.

Ingredients—

1. 870 grams tuna (5–6 cans) water packed
2. 20 grams dehydrated onion
3. 10 grams dehydrated celery
4. 300 grams of universal sauce base Preparation—

1. Drain tuna and reserve the water from the cans.
2. Soak the dehydrated onion and celery in the reserved water for about 2 hours until most of the water is absorbed.
3. Add 300 grams of the universal sauce base.
4. Combine tuna, vegetables, sauce and mix.
5. Package (glass jar or pouch).
6. Retort at about 90° C. for about 30 minutes.

Example 19

In this example, the universal sauce base is a shelf-stable component for a multi-component retail meal kit application. Any universal sauce base, either flavored or unflavored can be used in these types of applications. A Salsa Rosa Casserole kit comprising universal sauce base having the composition of Example 1 is described below.

Ingredients—

1. Dry Mix:
   a. 1.5 grams dry roasted red peppers ¼ inch dice
   b. 1.5 grams dry roasted green peppers ¼ inch dice
   c. 1.75 grams dry onion
   d. 5.0 grams quick cooking black beans
   e. 0.05 grams dry Jalepeno
   f. 1.50 grams roasted tomato flakes
   g. 0.40 grams Chili powder (from McCormick)
   h. 0.13 grams Mexican Oregano (from McCormick)
   i. 0.24 grams parsley
   j. 0.05 grams MSG
   k. 0.20 grams garlic
   l. 0.60 grams salt
2. 75 grams Corn Tortillas, sliced into ribbons
3. Liquid Seasonings:
   a. 50 grams commercially available prepared salsa
   b. ¼ cup water
4. 100 grams universal sauce base
5. ½ pound boneless skinless chicken breast in oil
6. Oil (for sautéing chicken)

In this application, the commercial meal kit would contain a packet each of universal sauce base, dry flavor mix and liquid seasoning, and the consumer supplies fresh tortillas and chicken to produce a fast, convenient, nutritious and appealing meal at home. The finished meal can be prepared as follows:

Preparation—

1. Combine dry mix ingredients. Combine salsa & water.
2. Saute chicken in oil until browned.
3. Add liquid seasonings, universal sauce base and dry mix.
4. Cover and cook at medium low heat for 5 minutes.
5. Add tortillas and cook another 5 minutes.

What is claimed is:

1. A microbiologically stable edible composition having a bland taste and an oil-in-water emulsion, the edible composition comprising from about 30% to about 80% water, about 5% to about 55% vegetable oil, about 3% to about 5.5% starch, about 3% to about 8% liquid phospholipase A2 modified egg yolk and about 1% to about 3% inorganic acid acidulent comprising at least phosphoric acid wherein the edible composition has a pH of from about 2.5 to about 4.

2. The food composition of claim 1 comprising from about 1.5% to about 4% dry phospholipase A2 modified egg yolk solids on dry weight basis in place of the liquid phospholipase A2 modified egg yolk.

3. The edible composition of claim 1 wherein the vegetable oil is selected from the group consisting of soybean oil, sunflower oil, canola oil, low erucic rapeseed oil, cottonseed oil, corn oil and combinations thereof.

4. The edible composition of claim 1 wherein the starch is non-modified starch, modified starch, instant starch, cook-up starch or combinations thereof.

5. The edible composition of claim 4 wherein the starch is selected from the group consisting of corn, waxy cornstarch, potato, rice, tapioca, wheat and combinations thereof.

6. The edible composition of claim 1 wherein the phospholipase A2 modified egg yolk has about 30% to about 95% conversion of egg phospholipid to lysolecithin.

7. The edible composition of claim 1 wherein the inorganic acid is further selected from the group consisting of sulfuric acid, hydrochloric acid and combinations thereof.

8. The edible composition of claim 1 wherein the acidulent further comprises organic acid.

9. The edible composition of claim 8 wherein the organic acid is selected from the group consisting of acetic acid, citric acid, lactic acid, adipic acid, malic acid and tartaric acid.

10. The edible composition of claim 1 further comprising optional ingredients selected from the group consisting of sweetener, xanthan gum, antioxidants, antimycotic agents, egg whites, additives, fillers and combinations thereof.

11. The edible composition of claim 10 wherein the sweetener is selected from the group consisting of sucrose, glucose, saccharin, dextrose, levulose, lactose, mannitol, sorbitol, fructose, maltose, xylitol, saccharin salts, thaumatin, D-tryptophan, dihydrochalcones, acesulfame, cyclamatic salts and combinations thereof.

12. The edible composition of claim 10 wherein the antimycotic agent is benzoic acid or sorbic acid.

13. The edible composition of claim 1 in combination with salt, spices, flavoring agents or combinations thereof.

14. The edible composition of claim 1 having a pH from about 2.5 to about 3.4.

15. The edible composition of claim 1 wherein the oil-in-water emulsion is heat stable towards emulsion breakage at about 90° C. for about 120 minutes or at about 120° C. for about 30 minutes.

16. A food comprising the edible composition of claim 1.

17. A method for making a microbiologically stable edible composition having bland taste and an oil-in-water emulsion comprising the steps of combining as ingredients about 30% to about 80% water, about 5% to about 55% vegetable oil, about 3% to about 5.5% starch, about 3% to about 8% liquid phospholipase A2 modified egg yolk and about 1% to about 3% inorganic acidulent comprising at least phosphoric acid and then mixing the combined ingredients to obtain the oil-in-water emulsion.

18. The method of claim 17 comprising the additional step of adding optional ingredients selected from the group consisting of sweetener, xanthan gum, antioxidants, antimycotic agents, egg whites, additives, fillers and combinations thereof to the combined ingredients either prior to the mixing or after the mixing.

19. The method of claim 17 where from about 1.5% to about 4.0% dry phospholipase A2 modified egg yolk solids on a dry weight basis are used in place of the liquid phospholipase A2 modified egg yolk.

20. The method of claim 17 wherein the universal sauce base has a pH of about 2.5 to about 4.

* * * * *